(12) United States Patent
Charron et al.

(10) Patent No.: US 9,175,604 B2
(45) Date of Patent: Nov. 3, 2015

(54) GAS TURBINE ENGINE WITH HIGH AND INTERMEDIATE TEMPERATURE COMPRESSED AIR ZONES

(75) Inventors: Richard C. Charron, West Palm Beach, FL (US); David A. Little, Chuluota, FL (US)

(73) Assignee: Siemens Energy, Inc., Orlando, FL (US)

(*) Notice: Subject to any disclaimer, the term of this patent is extended or adjusted under 35 U.S.C. 154(b) by 1090 days.

(21) Appl. No.: 13/227,769

(22) Filed: Sep. 8, 2011

(65) Prior Publication Data

US 2013/0061570 A1  Mar. 14, 2013

(51) Int. Cl.
  *F02C 3/14* (2006.01)
  *F23R 3/04* (2006.01)
  *F23R 3/26* (2006.01)

(52) U.S. Cl.
  CPC ... *F02C 3/14* (2013.01); *F23R 3/04* (2013.01); *F23R 3/26* (2013.01); *Y02E 20/16* (2013.01)

(58) Field of Classification Search
  CPC .............. F01D 9/023; F02C 3/14; F02C 3/12; F23R 3/04; F23R 3/26; F23R 3/002; F23R 2900/03041–2900/03044; F05D 2260/202; F23D 2214/00
  USPC ................. 60/752–760, 782–785, 39.37, 722
  See application file for complete search history.

(56) References Cited

U.S. PATENT DOCUMENTS

| | | | | |
|---|---|---|---|---|
| 4,297,842 | A * | 11/1981 | Gerhold et al. | 60/776 |
| 4,528,811 | A * | 7/1985 | Stahl | 60/784 |
| 4,614,083 | A * | 9/1986 | Teshima et al. | 60/39.53 |
| 4,991,391 | A * | 2/1991 | Kosinski | 60/39.182 |
| 5,802,841 | A * | 9/1998 | Maeda | 60/784 |
| 6,098,395 | A | 8/2000 | North | |
| 6,865,893 | B2 * | 3/2005 | Koganezawa et al. | 60/801 |
| 7,340,881 | B2 * | 3/2008 | Koganezawa et al. | 60/39.511 |
| 7,721,547 | B2 | 5/2010 | Bancalari et al. | |
| 7,827,801 | B2 | 11/2010 | Dawson et al. | |
| 2005/0241321 | A1 * | 11/2005 | Martling et al. | 60/796 |
| 2010/0018211 | A1 * | 1/2010 | Venkataraman et al. | 60/754 |
| 2010/0175387 | A1 | 7/2010 | Foust et al. | |
| 2010/0316492 | A1 * | 12/2010 | Charron et al. | 415/182.1 |
| 2011/0067405 | A1 * | 3/2011 | Armstrong et al. | 60/752 |
| 2013/0098063 | A1 * | 4/2013 | Mizukami et al. | 60/785 |

* cited by examiner

*Primary Examiner* — Phutthiwat Wongwian
*Assistant Examiner* — Carlos A Rivera

(57) ABSTRACT

A gas turbine combustor (26) disposed in a combustion air plenum (65) and a transition piece (28) for the combustor disposed in a separate cooling air plenum (58, 67). The combustion air plenum may receive combustion air (50) from a high-pressure compressor stage (22A). The cooling air plenum may receive cooling air (52) from an intermediate-pressure compressor stage (22B) at lower temperature and pressure than the combustion air. This cools the transition piece using less air than prior systems, thus making the gas turbine engine (20) more efficient and less expensive, because less expensive materials are needed and/or higher combustion temperatures are allowed. The cooling air may exit the cooling air plenum through holes (62) in a downstream portion (61) of the transition piece. An outer wall (72) on the transition piece may provide forced convection along the transition piece.

17 Claims, 5 Drawing Sheets

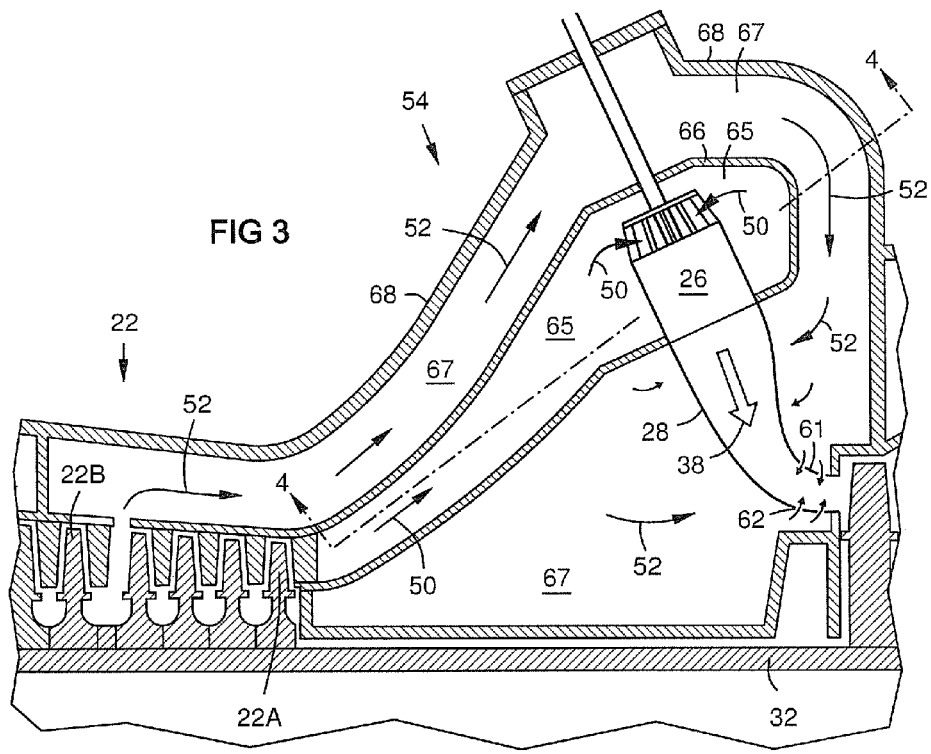
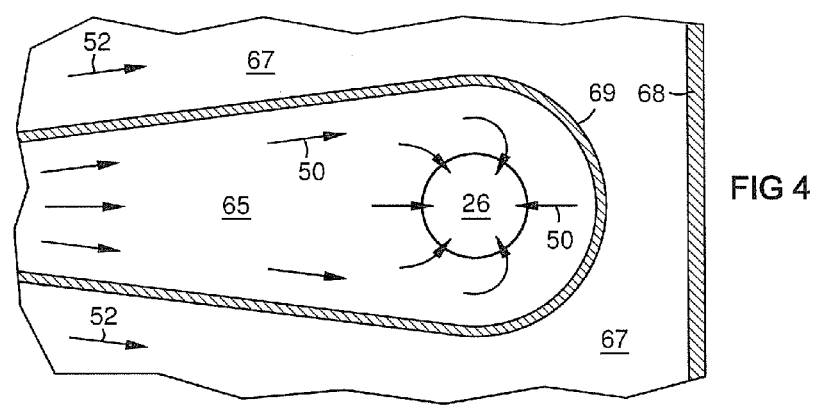

GAS TURBINE ENGINE WITH HIGH AND INTERMEDIATE TEMPERATURE COMPRESSED AIR ZONES

STATEMENT REGARDING FEDERALLY SPONSORED DEVELOPMENT

Development for this invention was supported in part by Contract No. DE-FC26-05NT42644. Accordingly, the United States Government may have certain rights in this invention.

FIELD OF THE INVENTION

This invention relates to turbine combustion system cooling with compressed air supplied at lower temperature and pressure than the compressed air for the combustor, and particularly to providing a separate compressed air plenum for the transition piece.

BACKGROUND OF THE INVENTION

The combustion system of a gas turbine contains the hot gasses and flame produced during the combustion process, and channels the hot gas to the turbine section of the engine. An industrial gas turbine engine commonly has several individual combustor assemblies arranged in a circular array about the engine shaft. A respective circular array of transition ducts, also known as transition pieces, connects the outflow of each combustor to the inlet of the turbine section. Each transition piece is a tubular structure that channels combustion gas between a combustor and the first row of stationary vanes or rotating blades of the turbine section, whichever comes first in a given engine design. U.S. Pat. No. 7,721,547 illustrates examples of such various engine designs.

To increase gas turbine engine efficiency, the temperature of the working gas in gas turbine designs is being increased. This requires increasing the compressor pressure ratio, which increases the temperature of the compressed air feeding the combustor. This same compressed air is commonly used both for combustion and for cooling the combustor and transition piece. However, the higher-temperature compressed air of modern gas turbine engines poses a challenge for materials of the combustion system, including the shell that encloses the combustion system. Either higher-priced materials or additional shell cooling, which penalizes cycle efficiency, is required.

BRIEF DESCRIPTION OF THE DRAWINGS

The invention is explained in the following description in view of the drawings that show:

FIG. 3 is a sectional view of a second exemplary embodiment of the invention.

FIG. 4 is a sectional view taken along line 4-4 of FIG. 3.

DETAILED DESCRIPTION OF THE INVENTION

Figure 1:
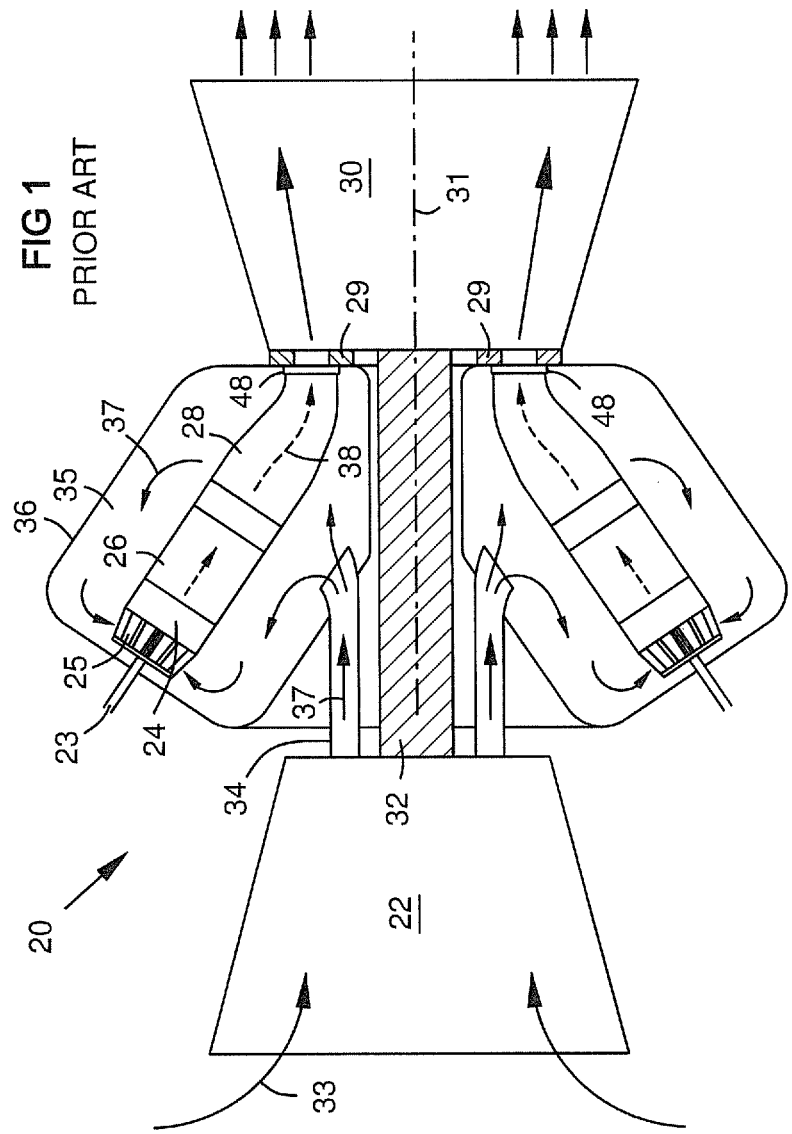
FIG. 1 is a schematic view of a prior art gas turbine design.

FIG. 1 is a schematic view of a prior art gas turbine engine 20, comprising a compressor 22, fuel supply lines 23, fuel injector cap assemblies 24 with compressed air inlets 25, combustion chambers 26, transition pieces 28, a turbine section 30, an engine shaft 32 by which the turbine drives the compressor, and a rotation axis 31. Several combustor assemblies 24, 26, 28 may be arranged in a circular array in a can-annular design. During operation, the compressor 22 intakes air 33, and provides compressed air 37 to the combustor inlets 25 via a diffuser 34 and a combustor plenum 35 enclosed by a shell 36. The fuel injectors in the cap assembly 24 mix fuel with the compressed air. This mixture burns in the combustion chamber 26, producing hot combustion gas 38, also called the working gas, which passes through the transition piece 28 to the turbine 30 via a sealed connection between an exit frame 48 of the transition piece and the turbine inlet hardware 29. The diffuser 34 and the combustor plenum 35 may extend annularly about the engine shaft 32. The compressed airflow 37 in the combustor plenum 35 has higher pressure than the working gas 38 in the combustion chamber 26 and in the transition piece 28.

Figure 2:
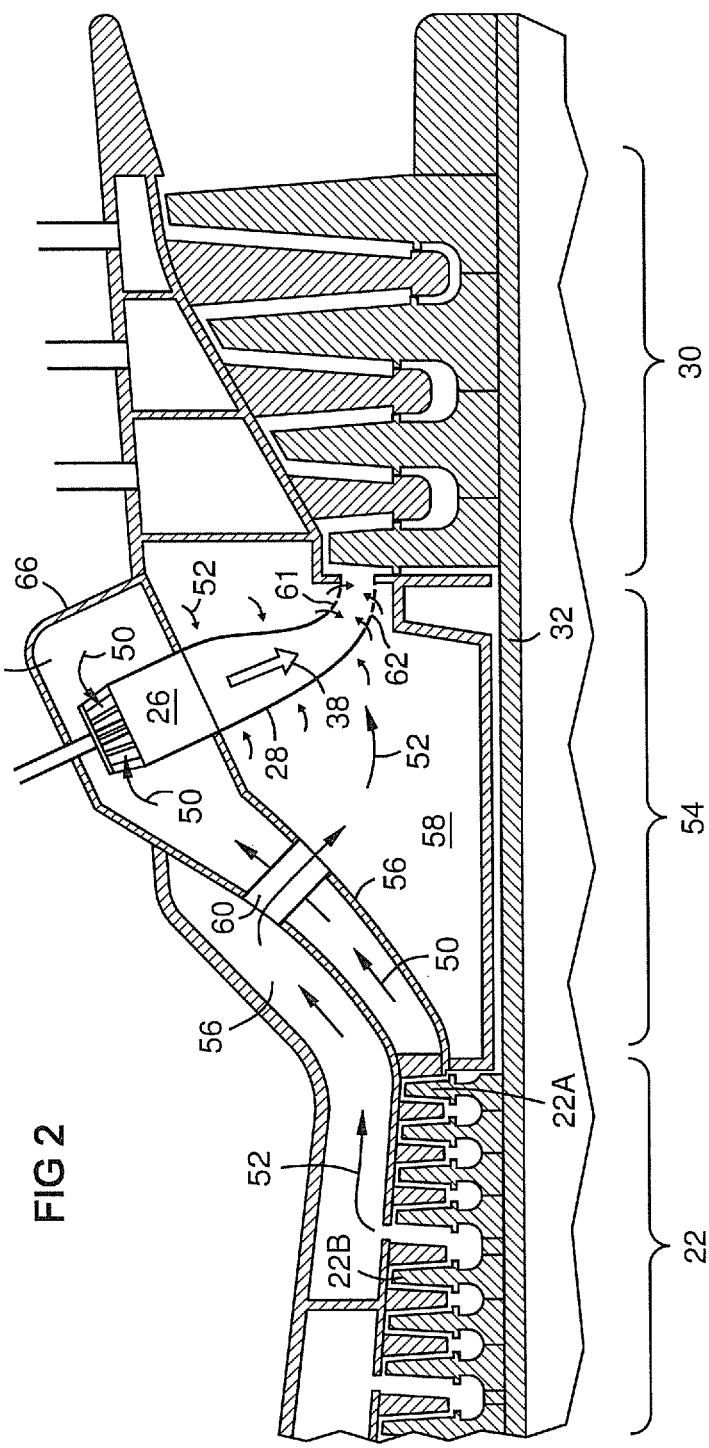
FIG. 2 is a sectional view of an exemplary embodiment of the invention.

FIG. 2 is a schematic view of an exemplary embodiment of the invention. The compressor 22 has a final high-pressure stage 22A that provides a supply of combustion air 50 at relatively high temperature and pressure for combustion. The compressor 22 also may have an air bleed from an intermediate-pressure stage 22B that provides a supply of cooling air 52 at a relatively lower temperature and pressure than that of the combustion air 50.

A combustor shell 66 encloses a combustion air plenum 65. A partition 56 in the combustion system 54 separates a transition cooling air plenum 58 from the combustion air plenum 65. The combustion air 50 enters the combustion air plenum 65, from which it enters the combustor 26 for combustion. The cooling air 52 enters the transition cooling air plenum 58, for example via a bypass flow path 60 as shown. It may exit via holes 62 in a downstream portion 61 or end of the transition piece. The cooling air exit holes 62 may be limited to a downstream portion of the transition piece where the pressure of the working gas 38 is below that of the cooling air 52 due to the static pressure drop of the working gas 38 along the length of the transition piece resulting from an acceleration of the flow in that region. The cooling air 52 surrounds and cools the transition piece 28, and provides a lower temperature and pressure in a portion 58 of the combustion system 54 than was possible in prior art designs.

An intermediate pressure level can be chosen for the cooling air 52 that provides enough pressure to enter at least a downstream portion 61 of the transition piece 28. The cooling air 52 is supplied at a lower temperature and pressure than the combustion air 50, so less total compressed air is required than in prior designs. This reduces engine emissions for a given temperature of the working gas 38 and/or it allows a higher temperature for a given emissions level, while increasing the efficiency of the engine. A higher working gas temperature is especially efficient in a combined cycle power plant that recovers exhaust heat from the gas turbine to drive a steam turbine.

FIG. 3 is a schematic view of a second exemplary embodiment of the invention. An outer shell 68 encloses the combustion system, and defines a cooling air plenum 67 therein. An inner shell 66 within the outer shell 68 defines a combustion air plenum 65 that is enclosed within the cooling air plenum 67 and is surrounded by the cooling air 52. The combustion air 50 enters the combustion air plenum 65, and feeds the combustor 26. The cooling air 52 enters the cooling air plenum 67, from which it may exit via cooling air exit holes 62 in a downstream portion 61 of the transition piece where the pressure of the working gas 38 is below that of the cooling air 52. The cooling air 52 cools the transition piece 28.

In this embodiment most of the combustion system 54 is bathed by cooling air 52, which has a lower temperature and pressure than that of the combustion air 50. The highest temperatures and pressures are limited to the inner shell 66, which serves as a duct for the combustion air 50 for the combustor 26. This limits the need for expensive high-temperature materials in the combustion system 54. The outer shell 68 may be annular about the turbine shaft 32, and may surround the whole combustion system 54. The inner shell 66 may also be annular centered on the turbine shaft 32, and may provide one cooling air plenum for multiple combustors 26. Alternately, it may be formed as a discrete duct 69 for each combustor 26 as shown in FIG. 4.

Figure 5:
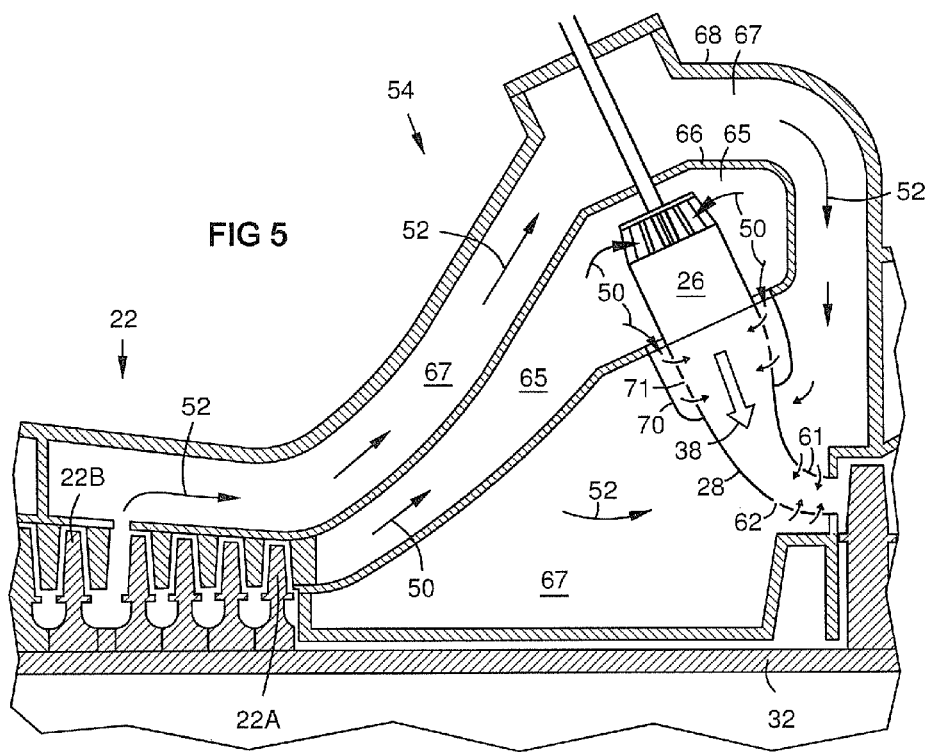
FIG. 5 is a sectional view of a third exemplary embodiment of the invention.

FIG. 5 shows an exemplary third embodiment, in which an upstream enclosure 70 surrounds only an upstream portion of the transition piece 28. The upstream enclosure 70 is open to the combustion air plenum 65. A portion of the combustion air 50 enters the upstream enclosure 70, from which it enters the working gas flow 38 through combustion air exit holes 74 in the upstream portion of the transition piece 28 for film cooling and/or for diluting the working gas 38 and reducing emissions. Such an upstream enclosure 70 may also be used in the embodiment of FIG. 2, in which it opens to the combustor plenum 65. Downstream cooling air exit holes 62 may be provided in the transition piece 28 as previously described.

Figure 6:
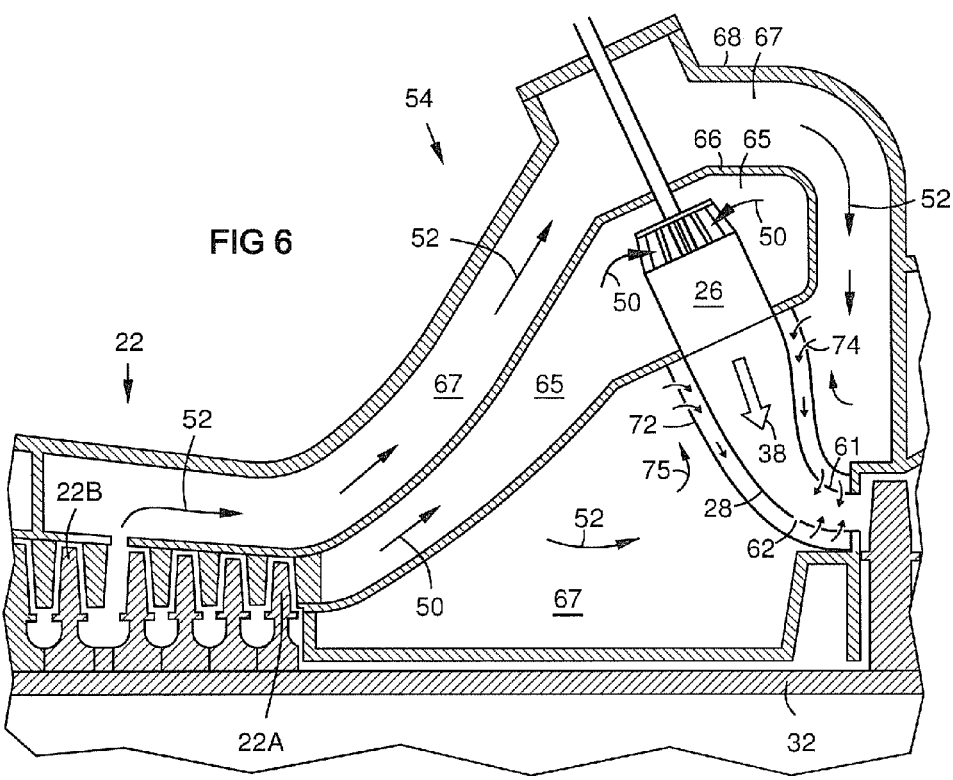
FIG. 6 is a sectional view of a fourth exemplary embodiment of the invention.

FIG. 6 shows an exemplary fourth embodiment, in which the transition piece 28 may be fully enclosed by an outer wall 72 with cooling air entry holes 74 only on an upstream portion thereof. The cooling air 52 flows upstream 75 along the outer wall 72 relative to the working gas flow 38. It then enters the cooling air entry holes 74 in the outer wall 72, then flows downstream within the outer wall 72 along the transition piece 28, then enters cooling air exit holes 62 in a downstream portion 61 of the transition piece 28. This circuit provides forced convection along the transition piece 28, and reduces heating of the air in the cooling air plenum 67. Such an outer wall 72 may also be used in the embodiment of FIG. 2.

The extent of the "upstream portion" and the "downstream portion", as used herein, may be determined by engineering considerations, including the relative gas pressures of the combustion air 50 and the cooling air 52, and the pressure drop in the working gas 38 along the length of the transition piece. An exemplary upstream portion of the transition piece 28 may be selected within the upstream 5-30% of the length of the transition piece. An exemplary downstream portion of the transition piece 28 may be selected within the downstream 5-30% of the length of the transition piece. An exemplary upstream portion of the outer wall 72 may be selected within the upstream 0-30% of the length of the outer wall, where 0% means the cooling air enters the upstream end of the outer wall.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine, comprising:
   a combustor within a combustion air plenum, wherein the combustor intakes combustion air from the combustion air plenum;
   a compressor comprising a final stage that supplies the combustion air to the combustion air plenum; and
   a transition piece within a cooling air plenum, wherein the cooling, air plenum receives cooling air bled from a bleed port of an intermediate stage of the compressor;
   wherein the transition piece channels a combustion gas from the combustor.

2. The gas turbine engine of claim 1, further comprising:
   cooling air exit holes in a downstream 5-30% of a length of the transition piece relative to a combustion gas flow direction therein;
   wherein the cooling air passes into the transition piece through the cooling air exit holes.

3. The gas turbine engine of claim 1, wherein the cooling air plenum is separated from the combustion air plenum by a partition there between.

4. The gas turbine engine of claim 1, wherein:
   the combustion air plenum is annular about a turbine axis;
   the cooling air plenum is annular about the axis; and
   the combustion air plenum is surrounded by the cooling air plenum.

5. The gas turbine engine of claim 1, wherein:
   the cooling air plenum is annular about a turbine axis;
   said combustor is one of a plurality of combustors in an annular array within the combustion air plenum which is disposed within the cooling air plenum.

6. The gas turbine engine of claim 5, wherein each of the combustors is enclosed by an inner shell that defines a discrete combustion air plenum for the combustor within the cooling air plenum.

7. The gas turbine engine of claim 1, further comprising:
   an upstream enclosure around only an upstream portion of the transition piece relative to a combustion gas flow direction therein, wherein the upstream enclosure is open to the combustion air plenum; and
   combustion air exit holes only in the upstream portion of the transition piece for the combustion air to exit the upstream enclosure into the transition piece.

8. The gas turbine engine of claim 7, wherein the upstream portion of the transition piece is selected within an upstream 5-30% of a length of the transition piece relative to the combustion gas flow direction therein, and a downstream portion of the transition piece is selected within a downstream 5-30% of a length of the transition piece relative to the combustion gas flow direction therein.

9. The gas turbine engine of claim 1, further comprising:
   an outer wall around the transition piece;
   cooling air entry holes only in an upstream portion of the outer wall relative to a combustion gas flow direction within the transition piece; and
   cooling air exit holes only in a downstream portion of the transition piece relative to the combustion gas flow direction within the transition piece;
   wherein the cooling air enters the cooling air entry holes, flows within the outer wall along the transition piece, then passes through the cooling air exit holes into the transition piece.

10. The gas turbine engine of claim 9, wherein the upstream portion of the outer wall is selected within an upstream 0-30% of a length of the outer wall relative to the combustion gas flow direction within the transition piece, and the downstream portion of the transition piece is selected within a downstream 5-30% of a length of the transition piece relative to the combustion gas flow direction within the transition piece.

11. A gas turbine engine comprising:
   a combustor within a combustion air plenum, wherein the combustion air plenum receives compressed combustion air from a final stage of a compressor of the gas turbine engine and the combustor receives the combustion air from the combustion air plenum;

a transition piece within a cooling air plenum; wherein the cooling air plenum receives compressed cooling air bled from a bleed port of an intermediate stage of the compressor of the gas turbine engine;

wherein the transition piece channels combustion gas from the combustor to an inlet of a turbine;

cooling air exit holes in a downstream 5-30% of a length of the transition piece relative to a combustion gas flow direction therein;

wherein the cooling air passes into the transition piece through the cooling air exit holes; and wherein the cooling air plenum is separated from the combustion air plenum by a partition there between.

12. A gas turbine engine, comprising:

an outer shell around a combustion system, the outer shell defining a cooling air plenum;

a combustion air plenum defined by an inner shell within the cooling air plenum;

a combustor within the combustion air plenum, wherein the combustor receives combustion air from the combustion air plenum;

a transition piece within the cooling air plenum, wherein the transition piece channels combustion gas from the combustor to an inlet of a turbine;

wherein the cooling air plenum receives compressed cooling air bled from a bleed port of an intermediate stage of a compressor; and cooling air exit holes in a downstream portion of a length of the transition piece relative to a combustion gas flow direction therein;

wherein the cooling air passes into the transition piece through the cooling air exit holes; and wherein the inner shell is surrounded by the cooling air.

13. The gas turbine engine of claim 12, wherein:

the combustion air plenum is annular about an axis of the turbine;

the cooling air plenum is annular about the axis of the turbine.

14. The gas turbine engine of claim 13, wherein:

the cooling air plenum is annular about an axis of the turbine;

said combustor is one of a plurality of combustors in a circular array within the combustion air plenum.

15. The gas turbine engine of claim 14, wherein each of the combustors is enclosed by a respective inner shell that defines a discrete combustion air plenum for the combustor within the cooling air plenum.

16. The gas turbine engine of claim 12, further comprising:

an upstream enclosure around only an upstream 5-30% of the transition piece relative to the combustion gas flow direction therein, wherein the upstream enclosure is open to the combustion air plenum; and combustion air exit holes in the upstream 5-30% of the transition piece for the combustion air to exit the upstream enclosure into the transition piece.

17. The gas turbine engine of claim 12, further comprising:

an outer wall around the transition piece;

cooling air entry holes in an upstream 5-30% of the outer wall relative to the combustion gas flow direction in the transition piece; and the cooling air exit holes in a downstream 5-30% of the transition piece relative to the combustion gas flow direction therein;

wherein the cooling air enters the cooling air entry holes, flows within the outer wall along the transition piece, and then passes through the cooling air exit holes into the transition piece.

\* \* \* \* \*